US006833822B2

(12) United States Patent
Klocek et al.

(10) Patent No.: US 6,833,822 B2
(45) Date of Patent: Dec. 21, 2004

(54) METHOD AND APPARATUS FOR GENERATING A VISIBLE IMAGE WITH AN INFRARED TRANSMISSIVE WINDOW

(75) Inventors: Paul Klocek, Dallas, TX (US); David H. Rester, Dallas, TX (US); Wayne A. Weimer, Plano, TX (US)

(73) Assignee: Raytheon Company, Waltham, MA (US)

( * ) Notice: Subject to any disclaimer, the term of this patent is extended or adjusted under 35 U.S.C. 154(b) by 222 days.

(21) Appl. No.: 09/746,551

(22) Filed: Dec. 21, 2000

(65) Prior Publication Data

US 2002/0135571 A1 Sep. 26, 2002

(51) Int. Cl.[7] .................................................. G09G 5/00
(52) U.S. Cl. ................................. 345/8; 345/9; 359/13; 359/15
(58) Field of Search ..................... 345/7–9; 359/13–15, 359/19, 355, 356, 533, 548; 250/330–334, 353, 339.6, 338.1; 348/115, 164, 290, 342

(56) References Cited

U.S. PATENT DOCUMENTS

| 4,564,276 | A |   | 1/1986  | Hofmann et al. |
|-----------|---|---|---------|----------------|
| 4,751,571 | A | * | 6/1988  | Lillquist ............... 348/164 |
| 5,414,439 | A | * | 5/1995  | Groves et al. ............ 345/7 |
| 5,497,266 | A | * | 3/1996  | Owen ................... 359/353 |
| 5,534,924 | A | * | 7/1996  | Florant ................. 348/364 |
| 5,629,074 | A | * | 5/1997  | Klocek et al. ........... 428/212 |
| 5,729,016 | A | * | 3/1998  | Klapper et al. .......... 250/334 |
| 5,763,882 | A | * | 6/1998  | Klapper et al. .......... 250/332 |
| 5,833,596 | A | * | 11/1998 | Bonnell et al. .......... 600/109 |
| 5,926,164 | A | * | 7/1999  | Terakawa et al. ........ 382/104 |
| 5,962,843 | A | * | 10/1999 | Sinor et al. .......... 250/214 VT |
| 6,150,930 | A | * | 11/2000 | Cooper ................ 340/435 |
| 6,359,737 | B1 | * | 3/2002 | Stringfellow ........... 359/631 |
| 6,429,429 | B1 | * | 8/2002 | Fohl et al. ............ 250/353 |
| 6,535,332 | B1 | * | 3/2003 | Nakano et al. ......... 359/356 |

FOREIGN PATENT DOCUMENTS

| EP | 0 758 834 A2 | 2/1997 |
| JP | 60194692     | 10/1985 |
| JP | 09039682     | 2/1997 |

OTHER PUBLICATIONS

Ford, et al., "Wavelength–selective planar holograms", OPTICS Letters, vol. 21, No. 1, Jan. 1, 1996, pp. 80–82.

* cited by examiner

Primary Examiner—Henry N. Tran
(74) Attorney, Agent, or Firm—Baker Botts L.L.P.

(57) ABSTRACT

A vehicle (10) includes an infrared imaging system (11). The system includes an infrared camera (12) positioned in the center of the front grille of the vehicle. The infrared camera includes a window (13) that has a holographic fringe pattern (14) which cooperates with visible light rays (27, 47, 52, 57) to generate an image (29) that is visible at a location spaced from the vehicle. The visible image may, for example, be a trademark or other symbol identifying the manufacturer of the vehicle. Infrared radiation (31) passes through the element and the structure thereof without significant change, and is detected by an infrared detector (33). A visible image corresponding to the infrared radiation is ultimately displayed by a head up display (19) on a portion (16) of the vehicle windshield (17).

21 Claims, 3 Drawing Sheets

US 6,833,822 B2

METHOD AND APPARATUS FOR GENERATING A VISIBLE IMAGE WITH AN INFRARED TRANSMISSIVE WINDOW

GOVERNMENT INTEREST

This invention was made with Government support under Contract No. DAAB 07-98-3-J002. The Government as certain rights in the invention.

TECHNICAL FIELD OF THE INVENTION

This invention relates in general to the field of infrared imaging and, more particularly, to an infrared transmissive window used for infrared imaging.

BACKGROUND OF THE INVENTION

Over the past several years, infrared radiation technology has evolved very quickly. One aspect of this evolution has been in the area of thermal imaging. Thermal imaging systems generally include infrared radiation components, such as an infrared transmissive window through which infrared radiation enters the system, an infrared detector which detects the infrared radiation that passes through the window, a circuit that processes the detected infrared radiation information, and a monitor that displays infrared radiation information received from the circuit. These infrared radiation components cooperate to display a view of a scene based on the thermal energy emitted by objects in the scene. These thermal imaging systems have been generally adequate for their intended purposes, but have not been satisfactory in all respects.

A problem with existing thermal imaging systems is that the infrared transmissive windows are generally uniform in visual appearance, and are thus lacking in aesthetic appeal. This is particularly a problem when the thermal imaging system is included in a vehicle. Thermal imaging systems that operate within a vehicle generally include an infrared transmissive window in the grille of the vehicle. The window has a blank appearance which gives the impression that something is missing from the window or grille structure.

Another problem with existing thermal imaging systems is that some infrared transmissive windows reflect visible light in a manner which draws more attention to the window than desired. There is a need for a window which blends better with its surroundings.

SUMMARY OF THE INVENTION

From the foregoing, it may be appreciated that a need has arisen for an apparatus and method that provide improved control over the manner in which an infrared transmissive window handles visible light. According to the present invention, an apparatus and method are provided to address this need, and involve: generating a visible image by causing visible radiation to cooperate with structure of an element in a manner so that the visible image is visible at a location spaced from the element; and passing infrared radiation through the element and the structure thereof without significant change in the infrared radiation.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
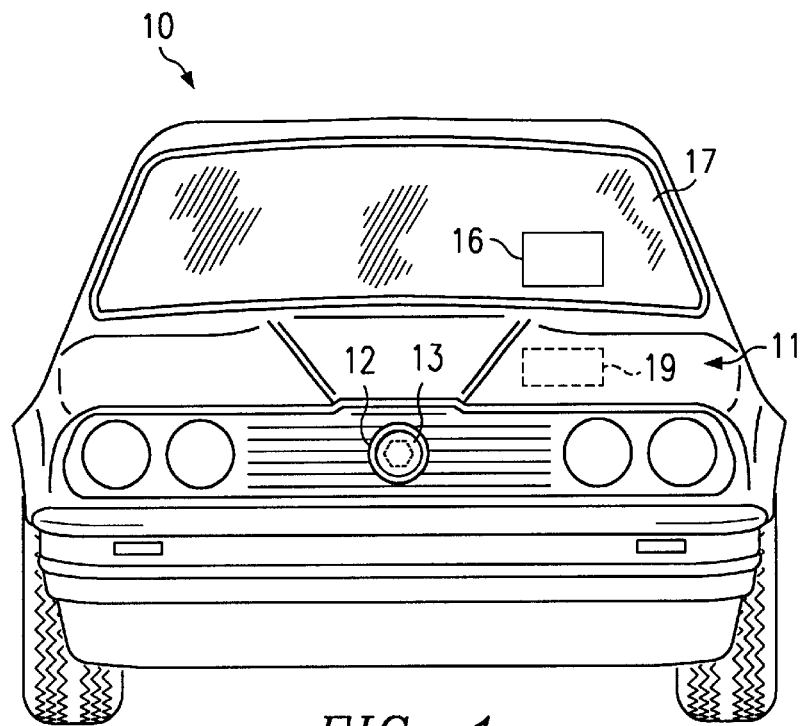
FIG. 1 is a diagrammatic front view of a vehicle which includes an infrared imaging system that embodies the present invention.

FIG. 1 is a diagrammatic front view of a vehicle 10 that includes an infrared imaging system 11. The system 11 includes an infrared camera 12 which is positioned in the center of the grille of the vehicle 10. The infrared camera 12 includes an element which is a window 13, through which infrared radiation enters the infrared camera 12. The base material for the window 13 is a polymer material disclosed in U.S. Pat. No. 5,629,074, the disclosure of which is hereby incorporated herein by reference. The material of the window 13 has added to it a commercially available black dye. The dye absorbs some visible radiation, but also enhances the reflectivity and increases the index of refraction of the window 13 relative to visible radiation in general. Alternatively, the window 13 could be made of some other suitable infrared transmissive material, such as silicon. Infrared radiation having a wavelength in the range of 8–12 μm passes through the window 13 without significant change. The infrared radiation that passes through the window 13 is emitted by a scene which includes animate or inanimate objects that are within the field of view of the infrared camera 12.

The window 13 includes a structure shown diagrammatically in broken lines, which is a holographic fringe pattern 14, commonly referred to as a hologram. The fringe pattern 14 is defined by undulations embossed in the center of the front surface of the window 13. However, the fringe pattern 14 could be created in some other known manner, for example by using a laser to burn the pattern into the material of the window 13. The fringe pattern 14 generates a visible image based on light in the visible spectrum. Although the fringe pattern 14 of the disclosed embodiment happens to be in the center of the window 13, it could alternatively be off-center, or it could be made up of a plurality of separate images at different locations on the window 13. Still another alternative is that the fringe pattern 14 could cover the entire window 13.

In FIG. 1, the image produced by the fringe pattern is a symbol or trademark which identifies the manufacturer of the vehicle 10. However, the visible image provided by the fringe pattern could alternatively be some other symbol, logo, text, pattern, picture, or image. If the camera 12 was being used in a security system to protect commercial premises, the image produced by the fringe pattern might be a random or other pattern that would allow the window to better blend in with its surroundings, thereby reducing the likelihood that an intruder would notice and disable the camera.

As shown in FIG. 1, a conventional head up display (HUD) 19 generates a view 16 of a scene that correlates to infrared radiation emitted by objects within the field of view of the infrared camera 12. The view 16 is displayed in a known manner on a portion of an inner surface of the vehicle's windshield 17. The windshield 17 is a standard automotive glass windshield made of an infrared and visible light transmissive material. Alternatively, the windshield 17 could be any transmissive material having a surface onto which an image could be projected by the (HUD) 19. The view 16 is monitored by a driver of the vehicle 10 while driving.

Figure 2:
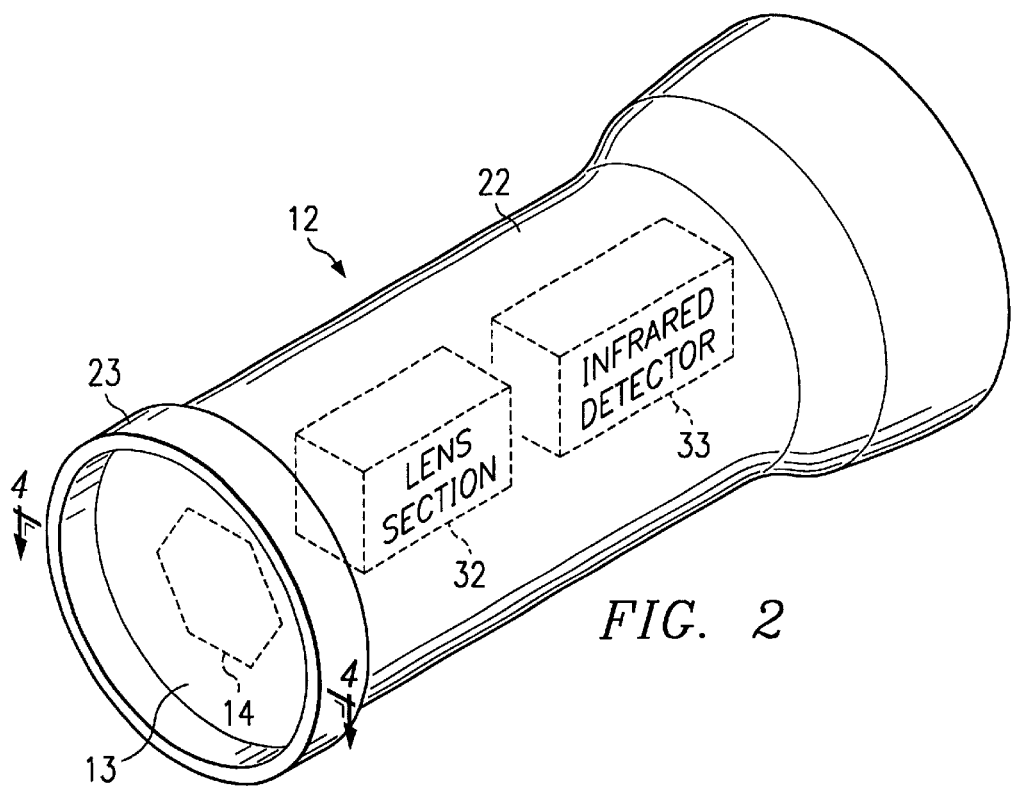
FIG. 2 is a diagrammatic perspective view of an infrared camera which is a component of the infrared imaging system of FIG. 1.

FIG. 2 is a diagrammatic perspective view that shows only the infrared camera 12. The infrared camera 12 includes a body 22 and a frame 23. The frame 23 of the infrared camera 12 encircles and supports the window 13. The frame 23 is an annular plastic part that is coupled to the body 22 and supported by the grille of the vehicle 10. Alternatively, the frame 23 could be made of any suitable material that could be fabricated to extend around the window 13. The body 22 of the infrared camera 12 is an elongated metal piece having a cavity therein. Alternatively, the body 22 could be made of any suitable material that can provide a strong degree of protection for components within the infrared camera 12.

A lens section 32 is included within the body 22 of the infrared camera 12, and is therefore shown diagrammatically in broken lines in FIG. 2. The lens section 32 includes a silicon lens that refracts infrared radiation. Alternatively, the lens section 32 can be any suitable refractive material, capable of imaging infrared radiation. The lens section 32 images the infrared radiation 31 passing through the window 13 in a known manner onto a conventional infrared detector 33, which is also disposed within the body 22 and thus shown diagrammatically by a broken line. The infrared detector 33 is an uncooled detector having a two-dimensional array of detector elements that detect infrared radiation impinging thereon. The infrared detector 33 could alternatively be any other suitable infrared detection mechanism. The infrared detector 33 is at an end of the body 22 of the infrared camera 12, opposite the frame 23. The infrared detector 33 receives the infrared radiation which has passed through the window 13 and the lens section 32. The lens section 32 and the infrared detector 33 will be discussed in more detail in association with FIG. 3.

Figure 3:
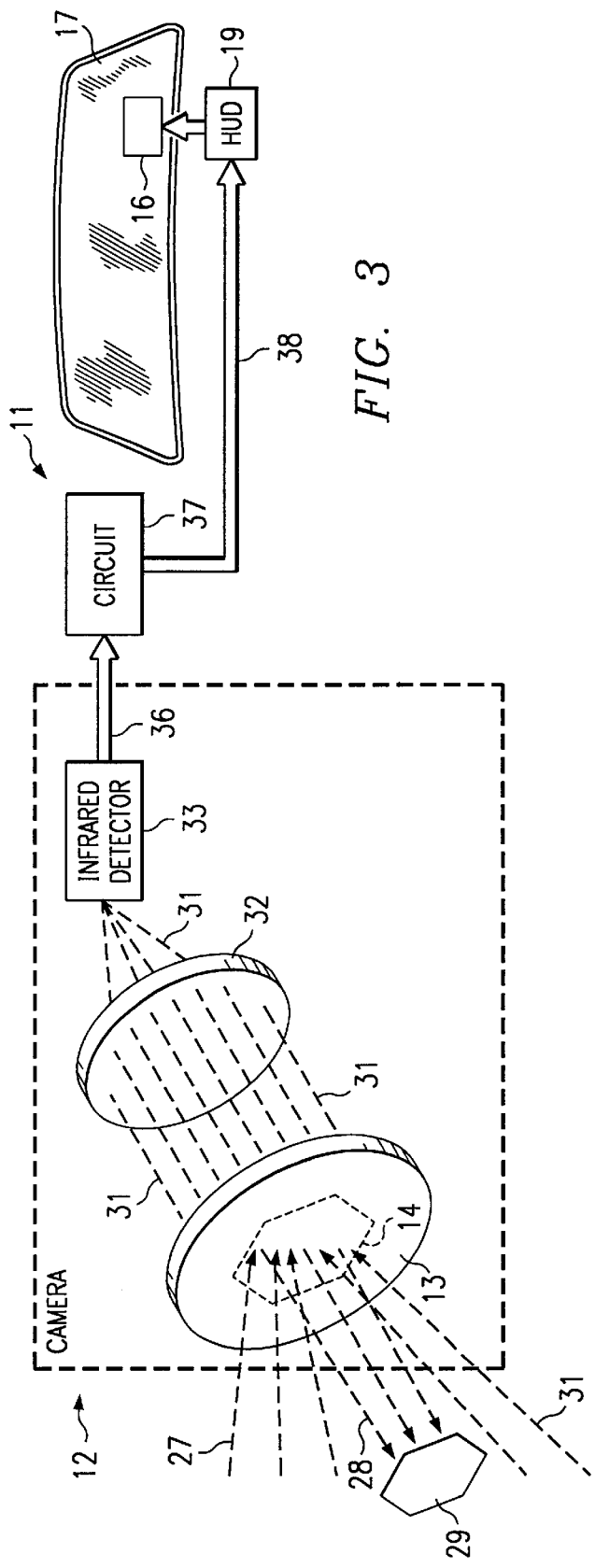
FIG. 3 is a diagrammatic view of the infrared imaging system of FIG. 1, showing details of the camera of FIG. 2.

FIG. 3 is a diagram showing in more detail the infrared imaging system 11, including the elements of the infrared camera 12, and how the infrared camera 12 is interfaced with a portion of the inner surface of the windshield 17 through the HUD 19. Light rays 27, in the visible spectrum, are reflected and/or scattered by the fringe pattern 14, so as to project at 28 in front of the vehicle 10 a visible image 29 which corresponds to the fringe pattern 14. Only a small portion of the visible light impinging on the window 13 is affected by the pattern 14, but it is enough that the image 29 is distinctly visible to the naked eye. The dye in the window 13 helps to increase the degree of reflection and/or scattering of visible light. While the image 29 is being continuously generated with visible light, infrared radiation 31 continues passing through the window 13 and its fringe pattern 14 relatively unaffected. Although the image in this disclosed embodiment is visible at a location in front of the window 13, it will be recognized that, where appropriate for some other application, it could be formed behind the window or within the window.

The infrared radiation 31 passing through the window 13 moves to the lens section 32. The infrared detector 33 receives the imaged infrared radiation 31 from the lens section 32 and converts it into electrical information 36 that is transmitted to a circuit 37 of a known type. The circuit 37 generates electrical data 38 corresponding to the scene which is viewed by the infrared camera 12. The data 38 is transmitted to the HUD 19. The HUD 19 uses the data 38 to generate a visible image of the scene which is projected as the view 16 onto a portion of the inner surface of the windshield 17. At night, the inner surface of the windshield will reflect enough light so that the view 16 will be clearly visible to the driver. The view 16 of the scene allows the driver of the vehicle 10 to monitor objects emitting thermal energy that are located in front of the vehicle 10. This view 16 of the scene allows the driver to monitor objects without detracting significantly from the view seen through the windshield 17 or the operation of the vehicle 10. At night, the driver may see in view 16 an animal or object which is beyond the range of the headlights, and thus not yet visible to the naked eye.

Figure 4:
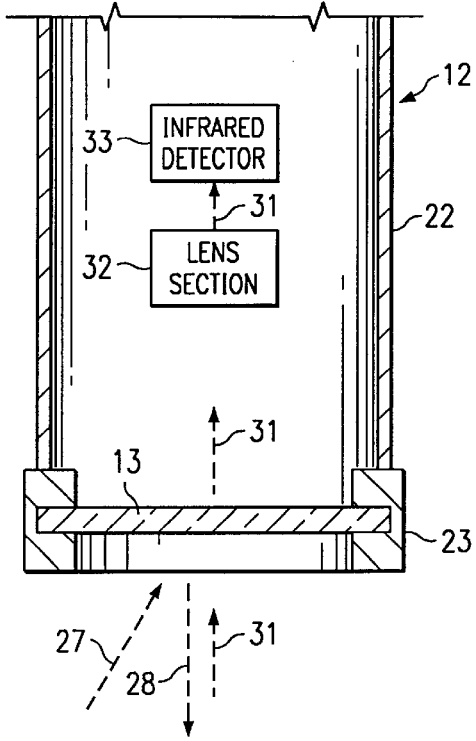
FIG. 4 is a diagrammatic sectional view taken along the line 4—4 in FIG. 2.

FIG. 4 is a diagrammatic sectional view of the infrared camera 12, taken along the line 4—4 of FIG. 2. FIG. 4 shows infrared radiation 31 passing through the window 13 of the infrared camera 12. The infrared radiation 31 moves to the lens section 32 where it is imaged onto the infrared detector 33. As discussed above, at least some visible ambient light rays 27 are reflected away the camera 12 by the fringe pattern 14. The reflected light rays 28 form the image 29 (FIG. 3) in front of the vehicle 10.

Figure 5:
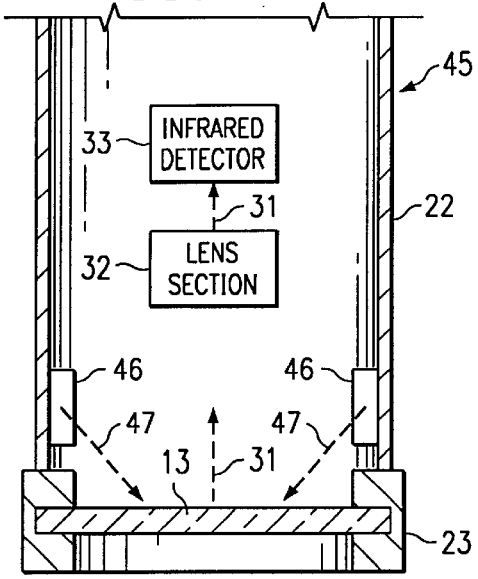
FIG. 5 is a diagrammatic sectional view similar to FIG. 4, but showing an alternative embodiment of the infrared camera.

FIG. 5 is a diagrammatic sectional view of an infrared camera 45 which is an alternative embodiment of the infrared camera 12 of FIG. 4. FIG. 5 shows artificial light sources 46 used to generate visible light that can produce the image 29. The light sources 46 are two units that are mounted on the inside of the body 22 of the infrared camera 45. The light sources 46 generate visible light rays 47 that propagate from within the body 22 of the infrared camera 45 toward the fringe pattern 14 of the window 13. As the visible light rays 47 pass through the window 13, they are affected by the fringe pattern 14 and thereafter carry the image 29 corresponding to the fringe pattern 14. The image 29 is thus projected in front of the vehicle 10. While this continuously occurs, the infrared radiation 31 continues to pass through the window 13 to the lens section 32 without being significantly affected. In this embodiment, the window 13 contains less dye than in the embodiment of FIGS. 1–4, so that in this embodiment more visible radiation will pass through the window 13 without being reflected back into the camera or absorbed within the window.

Figure 6:
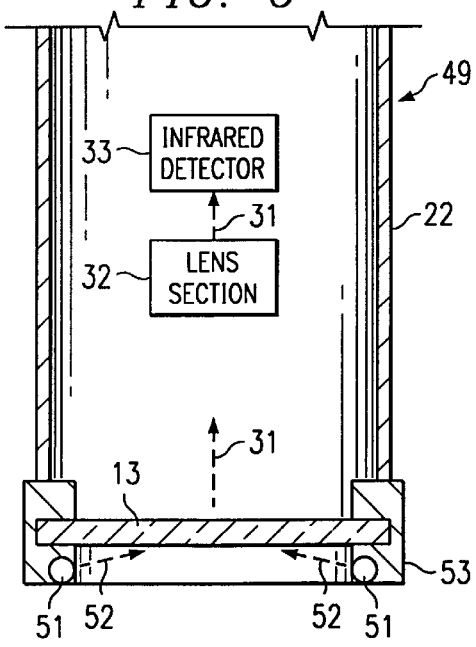
FIG. 6 is a diagrammatic sectional view similar to FIG. 4, but showing another alternative embodiment of the infrared camera.

FIG. 6 is also a diagrammatic sectional view of an infrared camera 49 which is another alternative embodiment of the infrared camera 12 of FIG. 4. FIG. 6 shows yet another pair of light sources 51 used to generate visible light that can produce the image 29. The lights sources 51 are two units that are mounted in the front of the frame 53 of the infrared camera 49. The light sources 51 generate visible lights rays 52 that propagate from the front of the frame 53 to the fringe pattern 14 of the window 13. At least some of the visible light rays 52 are reflected and/or scattered away from the camera 49 by the fringe pattern 14 and generate the image 29 corresponding to the fringe pattern 14. While this continuously occurs, the infrared radiation 31 continues to pass through the window 13 to the lens section 32 without being significantly affected.

Figure 7:
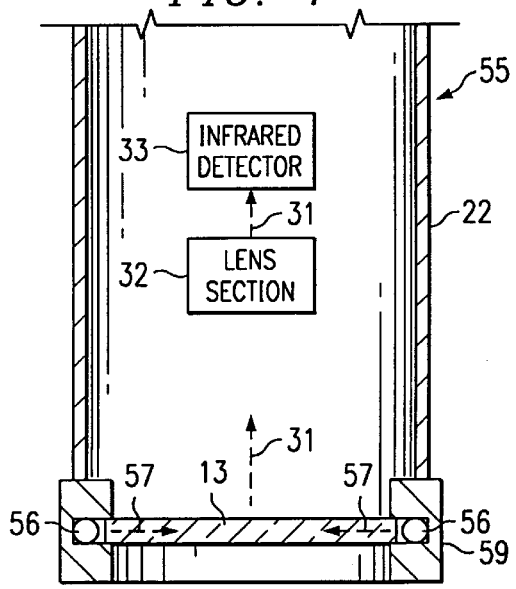
FIG. 7 is a diagrammatic sectional view similar to FIG. 4, but showing still another alternative embodiment of the infrared camera.

FIG. 7 is a diagrammatic sectional view of an infrared camera 55 which is yet another alternative embodiment of the infrared camera 12 of FIG. 4. FIG. 7 shows yet another pair of light sources 56 which are used to generate visible light that can produce the image 29. The light sources 56 are two units that are mounted in the frame 59 at the edges of the window 13 of the infrared camera 55. The light sources 56 generate visible lights rays 57 that propagate from the edges of the window 13 toward the fringe pattern 14. At least some of the light rays 57 are reflected and/or scattered at the fringe pattern 14 and project the image 29 corresponding to the fringe pattern 14. While this continuously occurs, the infrared radiation 31 continues to pass through the window 13 to the lens section 32 without being significantly affected. In this embodiment, the window 13 contains less dye than in the embodiments of FIGS. 1–4 and 6, so that in this embodiment more visible radiation will pass through the window 13 without being reflected or absorbed.

The light sources 46, 51, and 56, as shown in FIGS. 5–7, are all powered by the electrical system of the vehicle 10, including the battery and/or alternator. Alternatively, these light sources 46, 51, and 57 could be powered by any other suitable power source. In addition, FIGS. 5–7 illustrate the alternative light sources 46, 51, and 56 as being two units in each embodiment, but it will be recognized that these sources 46, 51, and 56 could alternatively be a single unit or multiple units either within or external to the infrared camera.

Figure 8:
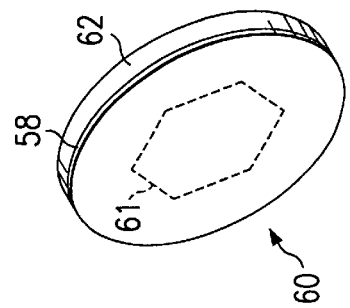
FIG. 8 is a diagrammatic perspective view of an alternative embodiment of an infrared transmissive window which is a component of the infrared camera of FIG. 2.

FIG. 8 shows a diagrammatic perspective view of a window 60 which is an alternative embodiment of the window 13 in the infrared camera 12 of FIG. 1. As illustrated in FIG. 8, the window 60 is an element that includes a sheet 58 and a plate-like member 62 made of conventional infrared transmissive silicon. The sheet 58 is a thin piece of infrared transmissive material such as that disclosed in above-mentioned U.S. Pat. No. 5,629,074. A structure that is a holographic fringe pattern 61 for a visible image is embossed into the sheet 58. The sheet 58 is then laminated in a known manner onto the member 62. If the materials of the member 62 and the sheet 58 have indices of refraction which are significantly different, these indices of refraction can be matched by providing between the member 62 and sheet 58 several layers or coatings of other materials with progressively increasing or decreasing indices of refraction. This matching of the indicies of refraction will avoid any significant reflection of infrared radiation at the interface between member 62 and sheet 58. Infrared radiation passes through the member 62 and its fringe pattern 61 substantially unaffected. The visible image corresponding to the fringe pattern 61 is generated in the same basic fashion as described above in association with FIG. 3.

A description will now be provided of the operation of the infrared camera 12 of FIGS. 1–4. AS shown in FIGS. 1, 2, and 3, infrared radiation passes through the window 13 without significant change. The infrared radiation that passes through the window 13 is emitted by a scene which includes animate or inanimate objects that are within the field of view of the infrared camera 12. The infrared radiation passes through the window 13 to the lens section 32. The lens section 32 images the infrared radiation 31 passing through the window 13 in a known manner onto a conventional infrared detector 33 which is disposed within the body 22 shown diagrammatically by a broken line. The infrared detector 33 receives the infrared radiation which has passed through the window 13 and the lens section 32, and converts it into electrical information 36 that is transmitted to a circuit 37. The circuit 37 generates electrical data 38 corresponding to the scene viewed by the infrared camera 12. The data 38 is transmitted to the HUD 19. The HUD 19 uses the data 38 to generate a visible image of the scene which is projected as the view 16 onto a portion of the inner surface of the windshield 17. The view 16 of the scene allows the driver of the vehicle 10 to monitor objects emitting thermal energy that are in front of the vehicle 10, without detracting significantly from the view seen through the windshield 17 or the operation of the vehicle 10.

Light rays 27, in the visible spectrum, are reflected away from the camera 12 by the fringe pattern 14, so as to project at 28 in front of the vehicle 10 a visible image 29 which corresponds to the fringe pattern 14. While the image 29 is being continuously generated with visible light, infrared radiation 31 continues passing through the window 13 and its fringe pattern 14 relatively unaffected.

The present invention provides a number of technical advantages. One such technical advantage is the ability of the present invention to generate a visible image that enhances the aesthetic appeal of a window of a thermal imaging system. Particularly in the case of a vehicle, the present invention could cause the otherwise blank space of the infrared transmissive window of the thermal imaging system to appear to bear a trademark, logo, or other indicia representative of the manufacturer of the vehicle. This greatly enhances the commercial appeal of the vehicle.

A further advantage of the present invention is the ability to generate a visible image that can be used to make the infrared transmissive window less noticeable, so as to allow the infrared transmissive window to better blend in with its surroundings.

Although one embodiment has been illustrated and described in detail, it should be understood that various substitutions and alterations can be made therein without departing from the scope of the present invention. For example, while the infrared imaging system has been described above with respect to a vehicle, it will be recognized that the invention could be used in virtually any infrared detecting system that has an infrared transmissive window. Also, although the present invention uses a holographic fringe pattern to generate a visible image, it would be possible to provide some other form of structure within the window, so long as it generated a visible image while passing infrared radiation substantially unchanged.

Other substitutions and alterations are also possible without departing from the spirit and scope of the present invention, as defined by the following claims.

What is claimed is:

1. An apparatus comprising an element having a surface and structure, the structure comprising a holographic fringe pattern embossed in the surface of the element, the structure operable to cooperate with visible light rays to generate an image which is visible at a location spaced from said element, wherein infrared radiation passes through said element and said structure thereof without significant change.

2. An apparatus according to claim 1, wherein said element includes a sheet and a member made of different materials, said sheet being coupled to said member and said sheet including said structure.

3. An apparatus according to claim 1, wherein said visible light rays, prior to cooperation with said structure of said element, are free of said image.

4. An apparatus comprising an element having a surface and an image-generating structure, the structure comprising a holographic fringe pattern embossed in the surface of the element, the structure operable to cooperate with visible light rays to generate an image which is visible at a location spaced from said element by being configured so that at least a portion of visible radiation arriving at said element on a first side thereof is influenced by said structure and thereafter travels away from said element on said first side thereof and represents a elected image which is different from an image of said element and which is visible to a naked eye at a location spaced from said element on said first side thereof, and said structure being further configured so that infrared radiation arriving at said element on said first side thereof passes through said element and said structure to a second side of said element in a manner free of any significant influence by said structure.

5. An apparatus according to claim 4, further comprising a light source which emits visible light rays, wherein said structure cooperates with light rays emitted by said light source to generate said selected image.

6. An apparatus according to claim 5, wherein said surface comprises one of a front surface and a rear surface, said location being on a side of said element corresponding to said front surface, and said light source projecting light rays onto one of said front and rear surfaces.

7. An apparatus according to claim 4, wherein said element includes a material and a dye disposed in said material.

8. An apparatus according to claim 4, wherein said element is a polymeric transmissive material that passes infrared radiation having a wavelength in the range of approximately 8–12 micrometers.

9. An apparatus according to claim 4, further comprising a frame, said frame supporting said element and including a light source, wherein said light source emits light rays that cooperate with said structure to generate said selected image.

10. An apparatus according to claim 4, further comprising an infrared detector, said infrared detector receiving infrared radiation which has passed through said element.

11. An apparatus according to claim 10, wherein said infrared detector is an uncooled detector, said uncooled detector having an array of detector elements for detecting infrared radiation impinging thereon.

12. An apparatus according to claim 1, further comprising a lens section positioned optically between said element and said infrared detector, said lens section focusing infrared radiation which has passed through said element onto said infrared detector.

13. An apparatus according to claim 12, further comprising a circuit and a display, said display including a display surface, said circuit receiving from said infrared detector electrical information representative of infrared radiation detected by said infrared detector, and providing on said display surface a visible image of a scene corresponding to the infrared radiation.

14. An apparatus according to claim 13, further comprising a vehicle with a windshield, said display surface being an inner surface of said windshield, said vehicle including said display, said element, said lens section, and said infrared detector.

15. An apparatus according to claim 4, wherein said element includes a sheet and a member made of different materials, said sheet being coupled to said member and said sheet including said structure.

16. An apparatus according to claim 4, wherein said visible radiation arriving at said element is free of said selected image.

17. A method comprising the steps of:

generating a visible image by causing at least a portion of visible radiation arriving at an element on a first side thereof to be influenced by structure of said element and to thereafter travel away from said element on said first side thereof while representing a selected image which is different from an image of said element and which is visible to a naked eye at a location spaced from said element on said first side thereof, the element having a surface, the structure comprising a holographic fringe pattern embossed in the surface of the element; and passing infrared radiation which arrives at said element on said first side thereof through said element and said structure to a second side of said element in a manner free of any significant influence by said structure.

18. A method according to claim 17, further comprising the step of generating visible light rays with a light source, said light rays being affected by said structure to generate said selected image.

19. A method according to claim 17, further comprising the step of selecting as said structure the holographic fringe pattern.

20. A method according to claim 17, further comprising the step of focusing infrared radiation which has passed through said element onto an infrared detector using a lens section, said lens section being positioned optically between said element and said infrared detector.

21. A method according to claim 17, including causing said visible radiation which arrives at said element to be free of said selected image.

* * * * *

UNITED STATES PATENT AND TRADEMARK OFFICE
CERTIFICATE OF CORRECTION

PATENT NO. : 6,833,822 B2
DATED : December 21, 2004
INVENTOR(S) : Paul Klocek et al.

It is certified that error appears in the above-identified patent and that said Letters Patent is hereby corrected as shown below:

Column 4,
Line 30, after "away", insert -- from --.
Line 57, before "sources", delete "lights" and insert -- light --.

Column 5,
Line 8, after "visible", delete "lights" and insert -- light --.
Line 54, after "shown", delete "AS" and insert -- As --.

Column 7,
Line 7, after "a", delete "elected" and insert -- selected --.
Line 43, after "claim", delete "1" and insert -- 11 --.

Signed and Sealed this

Fourteenth Day of March, 2006

JON W. DUDAS
*Director of the United States Patent and Trademark Office*